United States Patent

[11] 3,565,397

| [72] | Inventor | David G. Judge |
| | | 604 Stretford Road, Old Trafford, Manchester 16, England |
| [21] | Appl. No. | 681,770 |
| [22] | Filed | Nov. 9, 1967 |
| [45] | Patented | Feb. 23, 1971 |
| [32] | Priority | Dec. 17, 1966 |
| [33] | | Great Britain |
| [31] | | 56592/66 |

[54] JACKING DEVICE FOR MOTOR VEHICLES
6 Claims, 8 Drawing Figs.

| [52] | U.S. Cl. | 254/94 |
| [51] | Int. Cl. | B66f 3/00 |
| [50] | Field of Search | 254/94, (Vehicle Oper. Digest) |

[56] References Cited
UNITED STATES PATENTS

| 2,347,888 | 5/1944 | Currie | 254/94 |
| 2,497,726 | 2/1950 | Gustafson | 254/94 |

FOREIGN PATENTS

| 386,391 | 1/1933 | Great Britain | 254/94 |
| 600,034 | 7/1934 | Germany | 254/94 |

Primary Examiner—Lester M. Swingle
Attorney—Pearson & Pearson

ABSTRACT: A vehicle jack requiring no manual exertion is of the one piece, C-shaped "crutch" type having an upper limb for supporting the brake drum, an upstanding web greater in height than the distance from the brake drum to the ground and a lower limb resting on the ground. The upper limb is concave to fit the drum, the lower limb is flat to prevent topple of the vehicle and the device is free of bolt, strap, clamp or other connection to the wheel which require removal to remove the tire or wheel. Relatively wide tongue means on the jack slidably fits a relatively wide ventilation slot in the wheel as the only driving connection to assure the jack turning into position raising the vehicle.

PATENTED FEB 23 1971   3,565,397
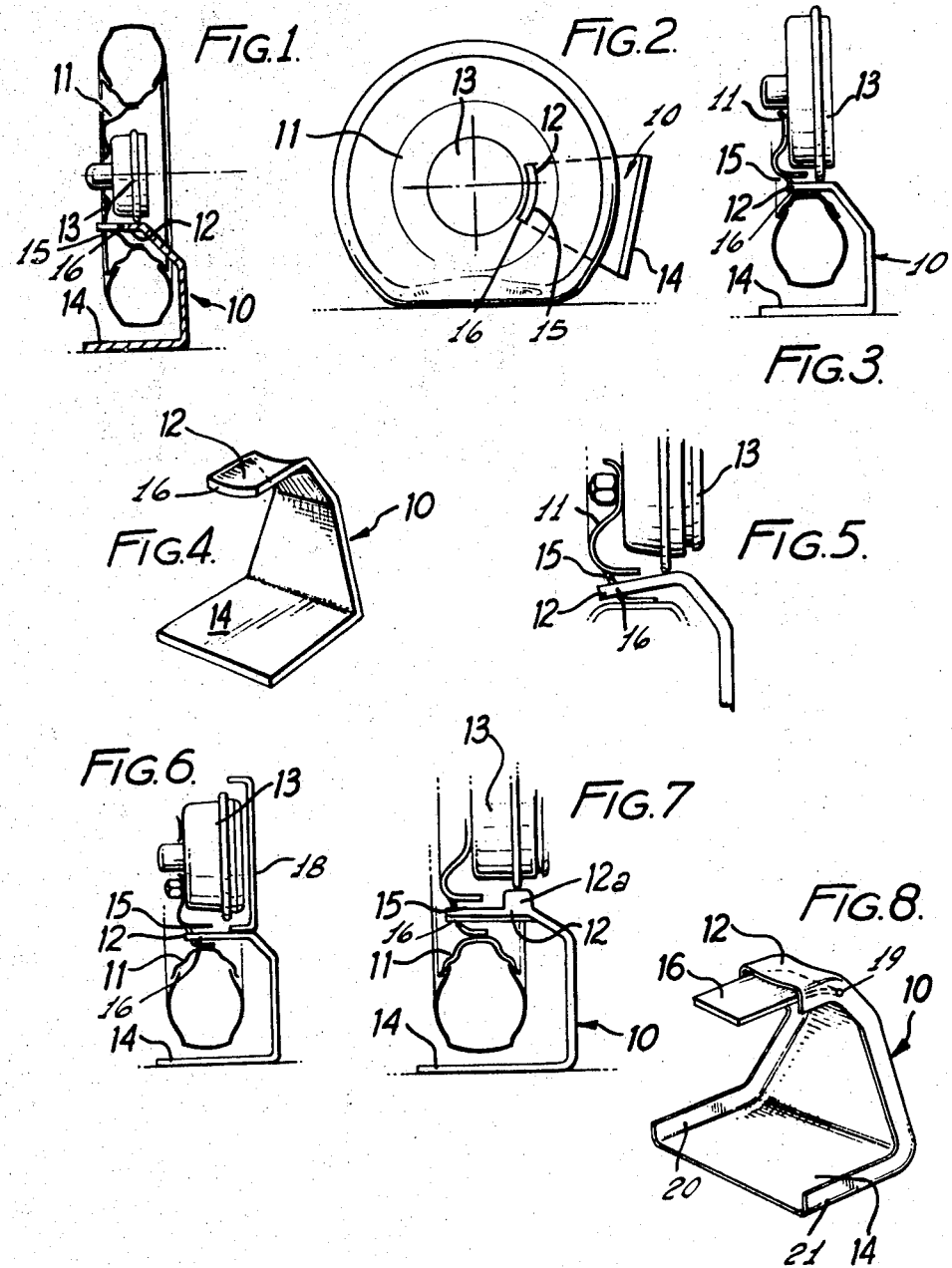
INVENTOR:
DAVID G. JUDGE
BY
Pearson + Pearson
ATTORNEYS

JACKING DEVICE FOR MOTOR VEHICLES

This invention relates to jacking devices for motor vehicles.

All of the jacking devices at present in use require some manual effort on the part of the user, whether this be pumping in the case of a hydraulic jacking device or turning in the case of a mechanically operated device. Whilst younger persons may be able to cope with this manual effort, in the case of older infirm persons, the jacking of a motor vehicle in this way is exhausting.

A main object of my invention therefore is to provide a jacking device which requires no manual effort whatsoever in jacking up vehicle wheels to enable the tire to be changed.

A jacking device for cars and according to my invention is adapted to fit behind a motor vehicle wheel, is adapted to lift the wheel clear of the ground by reaction against the ground when the vehicle is moved in a direction causing the wheel to move over the device, and is adapted to support the wheel clear of the ground and enable the wheel rim and tire to be removed and changed.

Thus it will be appreciated that the momentum of the vehicle (either as a result of being driven or by rolling freely) is utilized to lift the wheel and no manual effort is necessary.

The device preferably comprises a generally U-shaped member which in use is turned on its side so that the upper limb fits under the wheel axle to support same and the lower limb engages the ground.

The upper limb may be adapted to engage in at least one of the ventilation slots in the wheel disc to form a driving connection between the device and the wheel. It may be provided with a ridge for supporting a wheel brake drum if the wheel to be lifted has such drums.

The upper limb may have a tongue pivoted thereto, which tongue can extend through at least one of the ventilation slots of the wheel disc whilst the upper limb supports the wheel proper.

The lower limb may be provided with a pivotal latch at its free end, which latch can be pivoted over the front of the wheel and can engage in said ventilation slots in the wheel to provide a drive between the device and wheel.

The upper limb is preferably of curved cross section to provide an efficient support for the wheel and its axle, whilst the lower limb is flat to prevent the device from toppling over when supporting the wheel.

The principle of the invention will now be described by way of example only with reference to the accompanying drawings wherein:

FIG. 1 shows diagrammatically a section through a wheel of a motor vehicle which has been lifted clear of the ground by a jacking device according to the invention;

FIG. 2 is an end elevation of the wheel of FIG. 1 but with the device in a position prior to the raising of the wheel;

FIG. 3 is a sectional view similar to FIG. 1 but showing the jacking device in use with a different type of wheel;

FIG. 4, shows the jacking device of FIGS. 1, 2 and 3 in perspective view;

FIGS. 5, 6 and 7 are sectional views similar to FIGS. 1 and 3 showing modified forms of jacking devices; and FIG. 8 is a view similar to FIG. 4, but showing another embodiment.

In FIG. 1 there is shown in diagrammatic form a section through a vehicle wheel which has been lifted with a jacking device according to the present invention.

FIG. 2 shows an end elevation of the wheel of FIG. 1 with the jacking device in the position it occupies prior to the raising of the wheel. The jacking device is adapted to fit behind the wheel and to lift the wheel clear of the ground when same is moved in a direction causing the wheel to move over the jacking device. When this motion takes place the wheel is lifted by reaction from the ground through the jacking device and the device is adapted to support the wheel in the rest position and also to enable the wheel rim with the tire thereon to be removed and replaced. All of the devices according to the invention operate on this principle and the specific forms will now be described in more detail with reference to the drawings.

Referring more specifically now to FIGS. 1, 2 and 4, it will be seen that the jacking device 10 which supports the wheel 11 comprises a generally U-shaped member which in use is turned on its side so that the upper limb 12 engages he underside of the wheel brake drum 13 whilst the lower limb 14 rests on the ground. As shown clearly in FIG. 2, the lower limb 14 is flat whilst the upper limb 12 is of curved cross section to give a neat fit on the brake drum and to provide an effective support for the wheel. The lower limb is somewhat longer than the upper limb to prevent the device from toppling when the wheel 11 is supported thereby.

The jack according to FIGS. 1, 2 and 3 merely fits under the brake drum 13 and this device can be utilized to lift the wheel with which it is associated by causing the vehicle to move in the appropriate direction. Thus, considering FIG. 2 the wheel is to be moved by the vehicle in a direction from left to right in the drawing in which case the jacking 10 would rock on to limb 14 and raise wheel 11 clear of the ground. The wheel rim can be easily changed by loosening the usual studs which are provided on the brake drum and which hold the rim thereto. There is no driving connection between the jacking device and the wheel other than the friction between the drum and the limb 12 and between the ground and limb 14. However, with the configuration of jacking device shown the operation is satisfactory and the wheels are easily lifted thereby.

It is preferable however to provide a driving connection between the device and the wheel and I have found a satisfactory method of arranging for this is to extend the upper limb 12 with a thin wide preferably integral tongue 16 arranged to slidably pass through one of the narrow, elongated ventilation slots 15 (see FIGS. 3, 5, 6 and 7) of the wheel rim. In this case the device moves as a unit with the wheel to which it is attached so that lifting of the wheel by the jacking device is ensured. The embodiment of FIG. 5 shows an arrangement whereby the limb 12 and integral tongue 16 are inclined downwardly to pass through the slot 15. The FIG. 6 embodiment shows an arrangement where the wheel rests on the jacking device through the intermediary of a guard plate 18 and the integral tongue 16 is slidably inserted in a slot 15, and the embodiment of FIG. 7 shows an arrangement where the upper limb 12 is provided with a ridge 12a which engages the brake drum 13 and the driving action between the limb 12 and the wheel rim is maintained as the integral tongue 16 is slidably inserted through the ventilation slot 15.

These various embodiments of jacking devices were devised to suit the wheels of different cars also to suit the rear wheels and front wheels. Many of the embodiments envisage utilizing the brake drum and it may be that the device will have to be modified to suit vehicles which do not have drum brakes but have disc brakes. It is thought that the jacking device may be easier to use in such a case as usually the disc brakes are provided slightly inward of the wheel hubs.

In using the jacking device according to any one of the examples herein described, the device is simply positioned in the manner illustrated in FIG. 2 with the limb 12 either located on the brake drum and, preferably, with the tongue 16 inserted in a ventilation slot but otherwise free of bolt, strap, clamp or other connection to the wheel especially free of such connection on the outside which would interfere with removal of tire or wheel 11; then the vehicle is simply driven in a direction to cause the wheel 11 to be lifted by the device 10 into the position shown in FIG. 1 then the wheel rim and tire can be changed.

The two other modifications of the jacking device which operate in the same manner are illustrated in FIGS. 8 and 9.

In the modification illustrated in FIG. 8 upper limb 12 is provided with a tongue 16 pivotally connected thereto at 19, which tongue is for engaging any one of the ventilation slots of the car wheel. The limb 12 itself still serves the purpose of supporting the brake drum of the wheel. As shown in FIG. 8 the tongue 16 may be flat, or curved, to conform to the shape of corresponding slots 15 but preferably is not of round cross section, in the manner of a bolt, since rotation on the tongue axis is not desirable. The upper limb 12 is preferably concave, or arcuate in cross section as shown, and devoid of upstanding edge flanges. However, the jack 10 preferably includes a pair of continuous, inturned edge flanges 20 and 21 which add strength while providing a support for the pivot 19.

The device according to the present invention as hereinbefore described is preferably made of metal of a suitable strength to support the wheel. The device is cheap to make and in the case where there is engagement with the ventilation slots and the wheel is supported by the brake drum, there is no friction. Moreover, and most important, no physical effort is required to lift the car on to the jacking device or to lift the car to effect a change of tire. Also important is the securing of a driving connection by means of a tongue and slot connection, so that there is no interference on the outside of the wheel with changing the same and if an outside pivoted tongue such as 17a is used, it may be pivoted down out of the way as soon as the vehicle has been raised.

Many other modifications may be made without departing from the scope of the invention as defined in the appended claims.

I claim:

1. A jacking device for a vehicle wheel having a plurality of relatively narrow, elongated ventilation slots spaced therearound and extending therethrough;

said jacking device comprising a lower limb forming a base, an upper limb forming a table for supporting a brake drum of a vehicle, said upper and lower limbs each having a free terminal tip and an upstanding integral web connecting said limbs and of a height sufficient to support the wheel clear of the ground; and said device being independent of attachment to said wheel and said terminal tip of said upper limb including a relatively thin, wide rigid tongue, slidably inserted in one of said ventilation slots, for causing said jacking device to positively turn with said wheel to lift said vehicle.

2. A combination as specified in claim 1 wherein said rigid tongue is integral with, and in extension of, said terminal tip of said upper limb, and both said tongue and upper limb are of concave, arcuate cross section.

3. A combination as specified in claim 1 wherein said rigid tongue is in extension of, and pivotally mounted proximate, said terminal tip of said upper limb for accommodating itself to ventilation slots of the wheels of various vehicle types.

4. A combination as specified in claim 1 wherein said upper limb is of arcuate, concave cross section to conform to the exterior shape of said brake drum, said lower limb is of flat, rectilinear cross section to lie flatwise on the ground and said rigid tongue corresponds in cross section with the configuration of said ventilation slots.

5. A combination as specified in claim 3 wherein:
said jacking device includes a pair of inturned edge flanges, each extending under said upper limb, above said lower limb and inside said web; and
said flanges under said upper limb form the support for said pivoted tongue.

6. A jacking device for slotted wheels of vehicles, said device being of the generally U-shaped, one piece type with an upper limb for supporting a brake drum, a lower limb for forming a base and an integral upstanding web for connecting said limbs, the combination of:
a pair of integral inturned edge flanges extending under said upper limb, above said lower limb and inside said connecting web:
a relatively thin, wide tongue, pivotally mounted between the flanges of said upper limb and extending beyond the terminal end of said upper limb for slidable insertion in one of the slots of said vehicle wheel; and
whereby said jacking device positively turns with said wheel to lift position but is free of elements interfering with changing of the wheel.